: US 8,284,827 B2
(45) Date of Patent: Oct. 9, 2012

(12) United States Patent
Li et al.

(54) EQUALIZER AND METHOD APPLIED THERETO

(75) Inventors: Yi-Lin Li, Kao-Hsiung (TW); Cheng-Yi Huang, I-Lan Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 446 days.

(21) Appl. No.: 12/605,384

(22) Filed: Oct. 26, 2009

(65) Prior Publication Data

US 2010/0111158 A1 May 6, 2010

(30) Foreign Application Priority Data

Nov. 4, 2008 (TW) .............................. 97142503 A

(51) Int. Cl.
*H03K 5/159* (2006.01)
(52) U.S. Cl. ..................... 375/232; 375/229; 333/18
(58) Field of Classification Search .................. 375/232
See application file for complete search history.

(56) References Cited

U.S. PATENT DOCUMENTS

| | | | | |
|---|---|---|---|---|
| 4,584,614 A * | 4/1986 | Akiyama | ...................... | 386/263 |
| 5,200,977 A | 4/1993 | Ohnishi | | |
| 5,448,601 A * | 9/1995 | Choi | ........................... | 375/232 |
| 5,506,871 A * | 4/1996 | Hwang et al. | .................. | 375/230 |
| 5,818,653 A * | 10/1998 | Park et al. | ......................... | 360/32 |
| 5,844,951 A * | 12/1998 | Proakis et al. | ................. | 375/347 |
| 6,115,419 A * | 9/2000 | Meehan | ........................ | 375/233 |
| 6,259,751 B1 * | 7/2001 | Park et al. | ..................... | 375/346 |
| 6,345,020 B1 * | 2/2002 | Cho et al. | ..................... | 369/44.32 |
| 6,490,318 B1 * | 12/2002 | Larsson et al. | ................ | 375/232 |
| 7,274,715 B2 * | 9/2007 | Brioschi et al. | ............... | 370/516 |
| 7,315,591 B2 * | 1/2008 | Daishin et al. | ................. | 375/344 |
| 7,688,692 B2 * | 3/2010 | Chen | .......................... | 369/44.29 |
| 2003/0231726 A1 | 12/2003 | Schuchert | | |
| 2008/0062946 A1 * | 3/2008 | Jeong | ........................... | 370/342 |
| 2009/0052517 A1 * | 2/2009 | Chen | ............................ | 375/235 |
| 2010/0080276 A1 * | 4/2010 | Hwang et al. | ................ | 375/232 |
| 2010/0080280 A1 * | 4/2010 | Hwang et al. | ................ | 375/233 |

FOREIGN PATENT DOCUMENTS

CN 1688146 10/2005

OTHER PUBLICATIONS

English Abstract of CN1688146A (published Oct. 26, 2005).

* cited by examiner

*Primary Examiner* — David Ometz
*Assistant Examiner* — Santiago Garcia
(74) *Attorney, Agent, or Firm* — Thomas, Kayden, Horstemeyer & Risley, LLP

(57) ABSTRACT

The equalizer presented includes a first feed-forward equalization module, a second feed-forward equalization module, and a phase error corrector. The first and the second feed-forward equalization modules respectively receives an input real-part component signal and an input imaginary-part component signal of a complex input signal and respectively equalizes the input real-part component signal and the input imaginary-part component signal to generate a first real-part component signal and a first imaginary-part component signal. The phase error corrector is coupled to the first and the second feed-forward equalization modules for adjusting a complex phase corresponding to the first real-part component signal and the first imaginary-part component signal to generate a second real-part component signal and a second imaginary-part component signal according to a phase error information.

18 Claims, 4 Drawing Sheets

EQUALIZER AND METHOD APPLIED THERETO

BACKGROUND OF THE INVENTION

1. Field of the Invention

The present invention relates to an equalizer and a related method, and more particularly, to an apparatus and a related method for combining the equalizer with a phase error corrector to improve the performance of the equalizer.

2. Description of the Prior Art

In communication systems, inter-symbol interference (ISI) is a common phenomenon. The primary cause of ISI is multipath propagation. Hence, an equalizer is typically adopted in signal receivers for reducing effects resulted from multipath propagation during signal transmission.

When processing complex signals (such as a VSB signal) by adopting the equalizer, the performance of the equalizer will be restricted by the phase error existing between the signals of the equalizer if only a single equalizer is used for equalizing the real-part component of the complex signal. In addition, although the phase error of the signals processed by the equalizer is adjusted by adopting a phase error corrector, the performance of the equalizer may be poor since the phase error corrector only has a one-dimensional input (i.e., the real-part component). Hence, how to improve the performance of the equalizer has become one of the important topics of the field.

SUMMARY OF THE INVENTION

It is therefore one of the objectives of the claimed invention to provide an equalizer and a related method for solving the abovementioned problems.

According to an exemplary embodiment of the present invention, an equalizer is provided. The equalizer includes a first feed-forward equalization module, a second feed-forward equalization module, and a phase error corrector. The first feed-forward equalization module receives an input real-part component signal of a complex input signal and equalizes the input real-part component signal to generate a first real-part component signal. The second feed-forward equalization module receives the input imaginary-part component signal of the complex input signal and equalizes the input imaginary-part component signal to generate a first imaginary-part component signal. The phase error corrector is coupled to the first feed-forward equalization module and the second feed-forward equalization module for adjusting a complex phase corresponding to the first real-part component signal and the first imaginary-part component signal to generate a second real-part component signal and a second imaginary-part component signal according to a phase error information. The second feed-forward equalization module equalizes the input imaginary-part component signal according to tap coefficients adopted by the first feed-forward equalization module.

According to another exemplary embodiment of the present invention, a method applied to an equalizer is provided. The method includes the steps of receiving an input real-part component signal of a complex input signal, and equalizing the input real-part component signal to generate a first real-part component signal; receiving an input imaginary-part component signal of the complex input signal, and equalizing the input imaginary-part component signal to generate a first imaginary-part component signal; and adjusting a complex phase corresponding to the first real-part component signal and the first imaginary-part component signal to generate a second real-part component signal and a second imaginary-part component signal according to a phase error information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
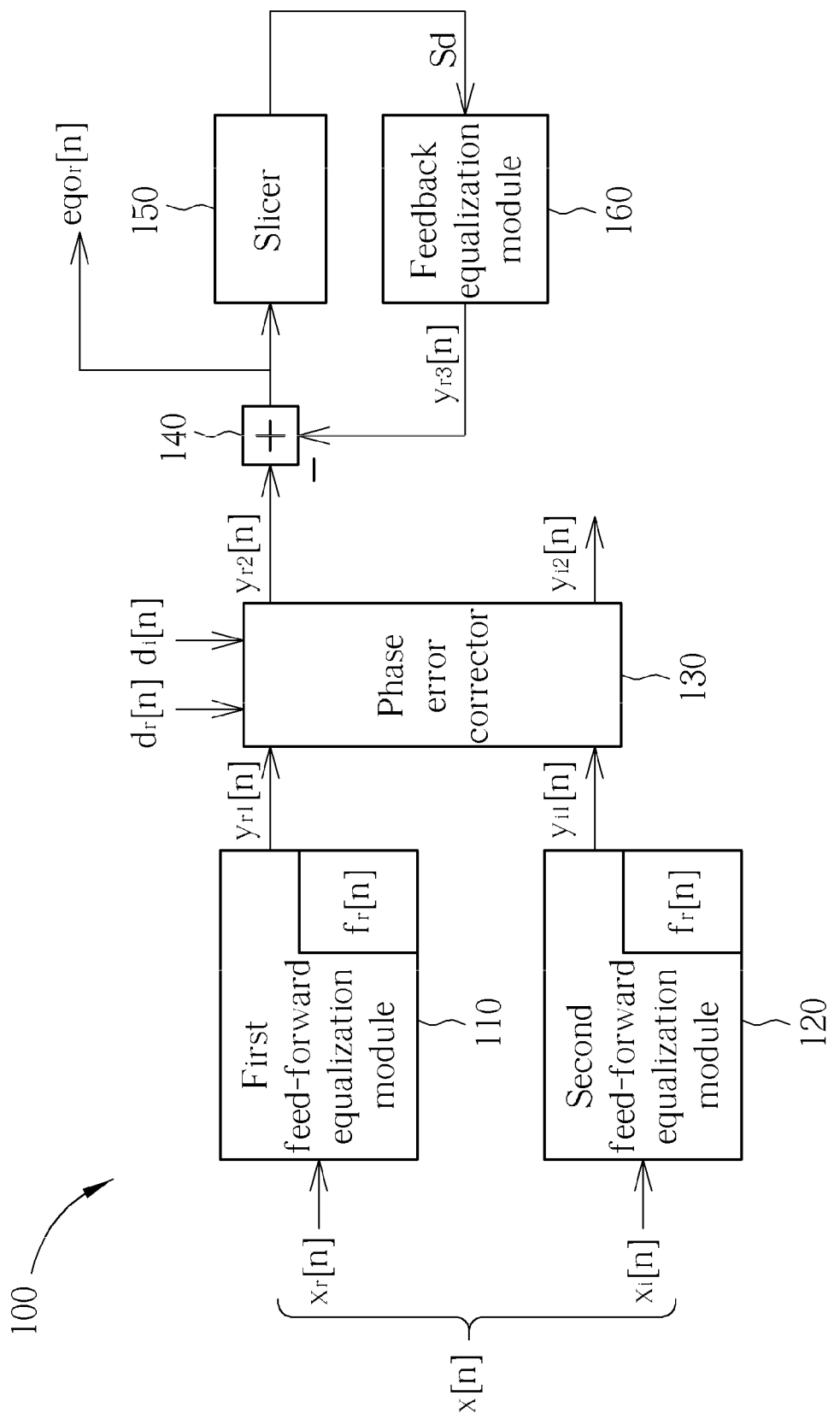
FIG. 1 is a diagram of an equalizer according to a first embodiment of the present invention.

FIG. 1 is a diagram of an equalizer 100 according to a first embodiment of the present invention. The equalizer 100 includes, but is not limited to, a first feed-forward equalization module 110, a second feed-forward equalization module 120, a phase error corrector 130, a first operator 140, a slicer 150, and a feedback equalization module 160. As shown in FIG. 1, the first feed-forward equalization module 110 receives an input real-part component signal $x_r[n]$ of a complex input signal $x[n]$, and equalizes the input real-part component signal $x_r[n]$ to generate a first real-part component signal $y_{r1}[n]$. The second feed-forward equalization module 120 receives an input imaginary-part component signal $x_i[n]$ of the complex input signal $x[n]$, and equalizes the input imaginary-part component signal $x_i[n]$ to generate a first imaginary-part component signal $y_{i1}[n]$. The phase error corrector 130 is coupled to the first feed-forward equalization module 110 and the second feed-forward equalization module 120 for adjusting a complex phase corresponding to the first real-part component signal $y_{r1}[n]$ and the first imaginary-part component signal $y_{i1}[n]$ to generate a second real-part component signal $y_{r2}[n]$ and a second imaginary-part component signal $y_{i2}[n]$ according to phase error information $d_r[n]$ and $d_i[n]$. In addition, the first operator 140 is coupled to the phase error corrector 130 for performing an operation on the second real-part component signal $y_{r2}[n]$ and a third real-part component signal $y_{r3}[n]$ to generate an output real-part component signal $eqo_r[n]$. The slicer 150 is coupled to the first operator 140 for performing a hard decision on the output real-part component signal $eqo_r[n]$ to generate a detecting result Sd. The feedback equalization module 160 is coupled to the slicer 150 and the first operator 140 for equalizing the detecting result Sd to generate the third real-part component signal $y_{r3}[n]$.

Please note that the abovementioned complex input signal $x[n]$ (including the input real-part component signal $x_r[n]$ and the input imaginary-part component signal $x_i[n]$) can be a vestigial sideband (VSB) signal, but the present invention is not limited to this only and can be signals of other types. In addition, the equalizer 100 can be a decision feedback equalizer (DFE), but this should not be considered as limitations of the present invention and can be an equalizer of other types.

Please also note that each of the first feed-forward equalization module 110 and the second feed-forward equalization module 120 can be implemented by a tapped delay line equalizer, wherein the second feed-forward equalization module 120 equalizes the input imaginary-part component signal $x_i[n]$ according to the tap coefficients $f_r[n]$ adopted by the first feed-forward equalization module 110. In other words, the second feed-forward equalization module 120 and the first feed-forward equalization module 110 adopt the same tap coefficients $f_r[n]$ to equalize the input imaginary-part component signal $x_i[n]$ and the input real-part component signal $x_r[n]$ respectively. This is merely a preferred embodiment of the present invention, and other manners capable of achieving the same goal under obeying the spirit of the present invention should also belong to the scope of the present invention.

In this embodiment, the first operator 140 is implemented by an adder. The adder subtracts the third real-part component signal $y_{r3}[n]$ from the second real-part component signal $y_{r2}[n]$ to generate the output real-part component signal $eqo_r[n]$. But this is not meant to be a limitation of the present invention, and operators of other types can be adopted to implement the first operator 140.

As can be known from FIG. 1, the input real-part component signal $x_r[n]$ and the input imaginary-part component signal $x_i[n]$ are respectively equalized by the first feed-forward equalization module 110 and the second feed-forward equalization module 120, and thus the signals inputted to the phase error corrector 130 consist of two-dimensional inputs, that is, the first real-part component signal $y_{r1},[n]$ and the first imaginary-part component signal $y_{i1}[n]$. Therefore, not only can the efficiency of the phase error corrector 130 for adjusting the phase error be improved, but also can the performance of the equalizer 100 be promoted. Moreover, the output real-part component signal $eqo_r[n]$ of the equalizer 100 can be obtained by processing the second real-part component signal $y_{r2}[n]$ outputted from the phase error corrector 130 according to its feedback circuits (i.e., the first operator 140, the slicer 150, and the feedback equalization module 160).

Figure 2:
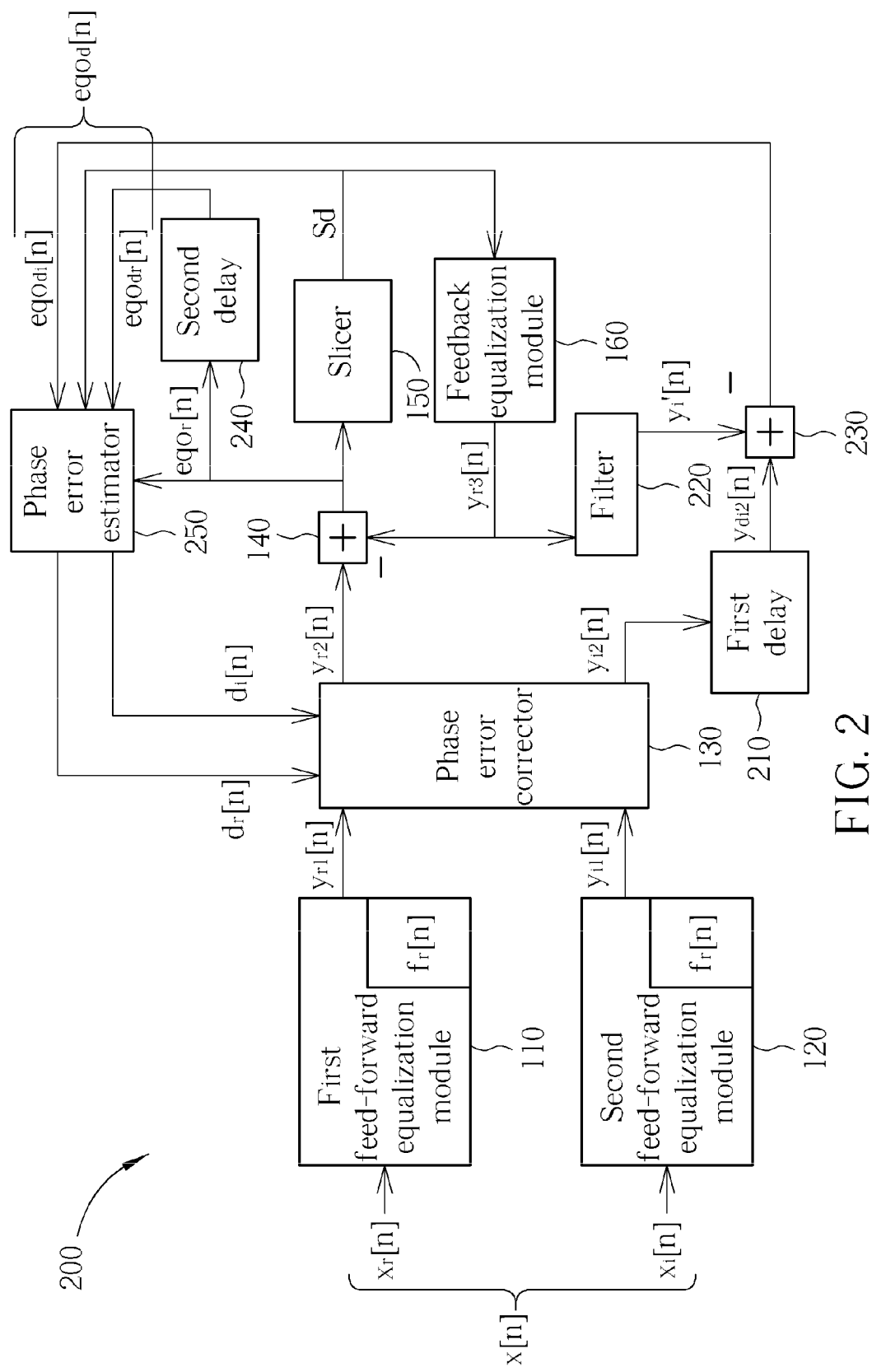
FIG. 2 is a diagram of an equalizer according to a second embodiment of the present invention.

Certainly, the abovementioned equalizer 100 is merely a practicable embodiment of the present invention. In other embodiments, more functions are designated into the equalizer to improve its performance. Please refer to FIG. 2. FIG. 2 is a diagram of an equalizer 200 according to a second embodiment of the present invention. The architecture of the equalizer 200 shown in FIG. 2 is similar to the equalizer 100 shown in FIG. 1, and the differences between them are described below. The equalizer 200 further consists of a first delay 210, a filter 220, a second operator 230, a second delay 240, and a phase error estimator 250. The first delay 210 is coupled to the phase error corrector 130 for delaying the second imaginary-part component signal $y_{i2}[n]$ to generate a delayed second imaginary-part component signal $y_{di2}[n]$. The filter 220 is coupled to the feedback equalization module 160 for receiving the third real-part component signal $y_{r3}[n]$ and for generating an estimated imaginary-part component signal $y_i'[n]$ according to the third real-part component signal $y_{r3}[n]$. After that, the second operator 230 performs an operation (such as a subtraction) on the delayed second imaginary-part component signal $y_{di2}[n]$ and the estimated imaginary-part component signal $y_i'[n]$ to generate a delayed output imaginary-part component signal $eqo_{di}[n]$. The second delay 240 is coupled to the first operator 140 for delaying the output real-part component signal $eqo_r[n]$ to generate a delayed output real-part component signal $eqo_{dr}[n]$, wherein the delayed output real-part component signal $eqo_{dr}[n]$ and the delayed output imaginary-part component signal $eqo_{di}[n]$ form a delayed complex output signal $eqo_d[n]$. In addition, the phase error estimator 250 is coupled to the phase error corrector 130 for estimating the phase error information $d_r[n]$ and $d_i[n]$ according to at least one signal among the detecting result Sd, the output real-part component signal $eqo_r[n]$, the delayed output real-part component signal $eqo_{dr}[n]$, and the delayed output imaginary-part component signal $eqo_{di}[n]$.

In this embodiment, the filter 220 can be a Hilbert Transform circuit or its approximation, but this is not a limitation of the present invention. After the third real-part component signal $y_{r3}[n]$ is processed by the filter 220, an estimated value of the imaginary-part component (i.e., the estimated imaginary-part component signal $y_i'[n]$) will be generated. Due to the characteristics of the Hilbert Transform circuit being well-known to those skilled in the art, and further detailed description is omitted herein for brevity. Furthermore, the second operator 230 can be implemented by an adder. The adder subtracts the estimated imaginary-part component signal $y_i'[n]$ from the delayed second imaginary-part component signal $y_{dr2}[n]$, so as to obtain the delayed output imaginary-part component signal $eqo_{di}[n]$ of the equalizer 200. But this is not meant to be a limitation of the present invention, and operators of other types can be adopted to implement the second operator 230.

Please note that the phase error information $d_r[n]$ and $d_i[n]$ constitute a pair of complex signal, which can be expressed by the following equations:

$$d_r[n]=\cos \Delta\theta \quad (1); \text{ and}$$

$$d_i[n]=\sin \Delta\theta \quad (2).$$

In complex signal processing, the behavior of the phase error corrector 130 represents a result of rotating the complex signal $(y_{r1}[n]+j^*y_{i1}[n])$ with an angle $\Delta\theta$, which can be expressed by the following equations:

$$y_{r2}[n]=y_{r1}[n]^*d_r[n]-y_{i1}[n]^*d_i[n] \quad (3); \text{ and}$$

$$y_{i2}[n]=y_{r1}[n]^*d_i[n]+y_{i1}[n]^*d_r[n] \quad (4)$$

As can be known from FIG. 2, since the phase error estimator 250 can estimate the phase error information $d_r[n]$ and $d_i[n]$ according to at least one signal among the detecting result Sd, the output real-part component signal $eqo_r[n]$, the delayed output real-part component signal $eqo_{dr}[n]$, and the delayed output imaginary-part component signal $eqo_{di}[n]$, the phase error of the first real-part component signal $y_{r1}[n]$ and the first imaginary-part component signal $y_{i1}[n]$ can be substantially improved, so as to promote the performance of the equalizer.

Figure 3:
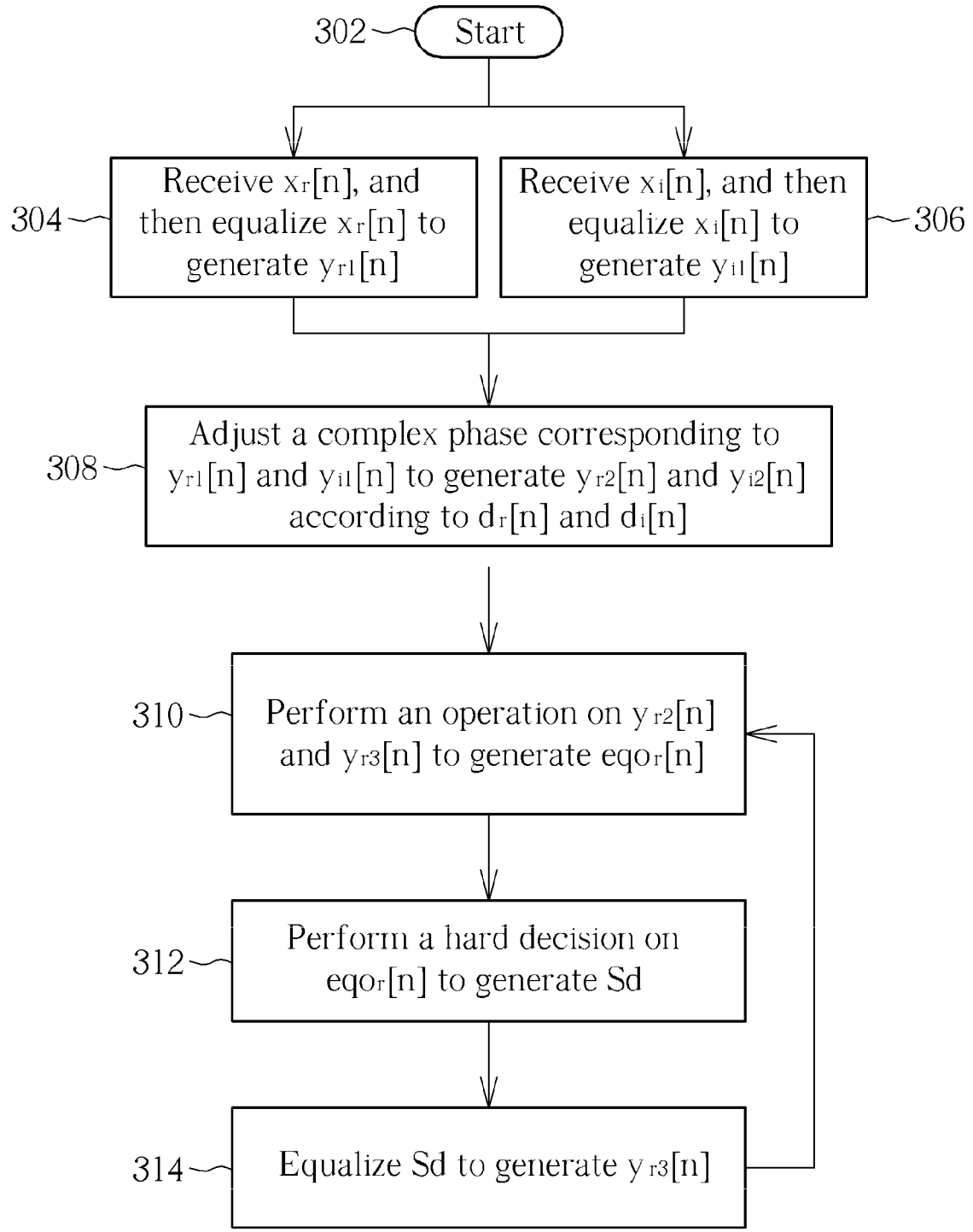
FIG. 3 is a flowchart illustrating a method applied to an equalizer according to an exemplary embodiment of the present invention.

Please refer to FIG. 3. FIG. 3 is a flowchart illustrating a method applied to an equalizer according to an exemplary embodiment of the present invention. Please note that the following steps are not limited to be performed according to the exact sequence shown in FIG. 3 if a roughly identical result can be obtained. The method includes, but is not limited to, the following steps:

Step 302: Start.

Step 304: Receive an input real-part component signal of a complex input signal, and equalize the input real-part component signal to generate a first real-part component signal. Go to Step 308.

Step 306: Receive an input imaginary-part component signal of the complex input signal, and equalize the input imaginary-part component signal to generate a first imaginary-part component signal. Go to Step 308.

Step 308: Adjust a complex phase corresponding to the first real-part component signal and the first imaginary-part component signal to generate a second real-part component signal and a second imaginary-part component signal according to a phase error information. Go to Step 310.

Step 310: Perform an operation on the second real-part component signal and a third real-part component signal to generate an output real-part component signal. Go to Step 312.

Step 312: Perform a hard decision on the output real-part component signal to generate a detecting result. Go to Step 314.

Step 314: Equalize the detecting result to generate the third real-part component signal.

How each element operates can be known by collocating the steps shown in FIG. 3 and the elements shown in FIG. 1. Further description of the operations of each step shown in FIG. 3 is omitted here for brevity.

Figure 4:
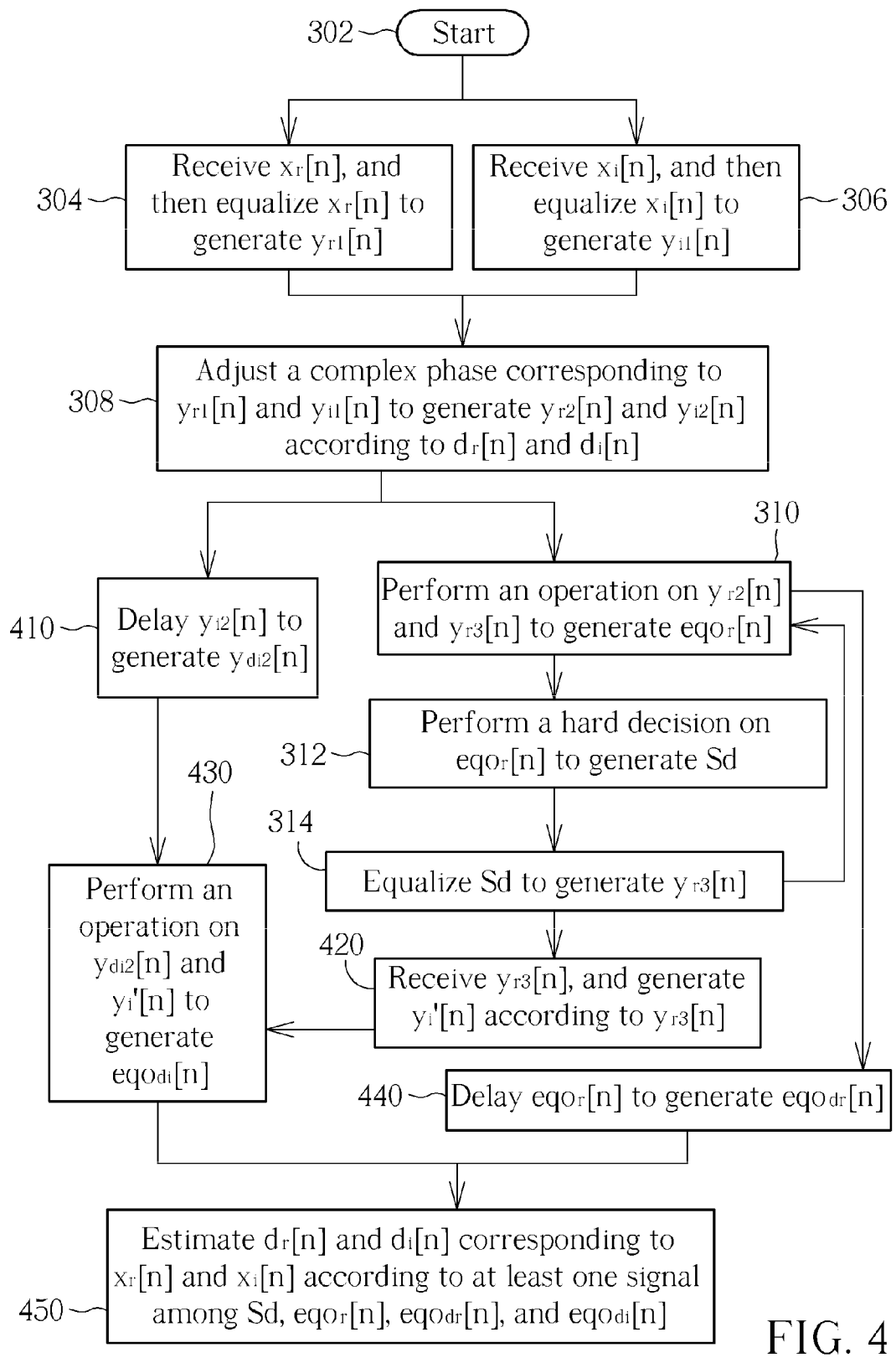
FIG. 4 is a flowchart illustrating a method applied to an equalizer according to another exemplary embodiment of the present invention.

Please refer to FIG. 4. FIG. 4 is a flowchart illustrating a method applied to an equalizer according to another exemplary embodiment of the present invention. The method includes, but is not limited to, the following steps:

Step 302: Start.

Step 304: Receive an input real-part component signal of a complex input signal, and equalize the input real-part component signal to generate a first real-part component signal. Go to Step 308.

Step 306: Receive an input imaginary-part component signal of the complex input signal, and equalize the input imaginary-part component signal to generate a first imaginary-part component signal. Go to Step 308.

Step 308: Adjust a complex phase corresponding to the first real-part component signal and the first imaginary-part component signal to generate a second real-part component signal and a second imaginary-part component signal according to a phase error information. Go to Step 310 and Step 410.

Step 310: Perform an operation on the second real-part component signal and a third real-part component signal to generate an output real-part component signal. Go to Step 312.

Step 312: Perform a hard decision on the output real-part component signal to generate a detecting result. Go to Step 314.

Step 314: Equalize the detecting result to generate the third real-part component signal. Go to Step 420.

Step 410: Delay the second imaginary-part component signal to generate a delayed second imaginary-part component signal. Go to Step 430.

Step 420: Receive the third real-part component signal, and generate the estimated imaginary-part component signal according to the third real-part component signal. Go to Step 430.

Step 430: Perform an operation on the delayed second imaginary-part component signal and the estimated imaginary-part component signal to generate a delayed output imaginary-part component signal. Go to Step 450.

Step 440: Delay the output real-part component signal to generate a delayed output real-part component signal. Go to Step 450.

Step 450: Estimate the phase error information corresponding to the input real-part component signal and the input imaginary-part component signal according to at least one signal among the detecting result, the output real-part component signal, the delayed output real-part component signal, and the delayed output imaginary-part component signal.

The steps shown in FIG. 4 are similar to the steps shown in FIG. 3, as FIG. 4 is a variation of the embodiment shown in FIG. 3. The difference between them is that the operations and functions of the first delay 210, the filter 220, the second operator 230, the second delay 240, and the phase error estimator 250 (i.e., the steps 410~450) are added into the flowchart of FIG. 4. Therefore, the phase error of the first real-part component signal $y_{r1}[n]$ and the first imaginary-part component signal $y_{i1}[n]$ can be further improved. How each element operates can be known by collocating the steps shown in FIG. 4 and the elements shown in FIG. 2. Further description of the operations of each step shown in FIG. 4 is omitted here for brevity.

Be note that the steps of the flowchart mentioned above are merely a practicable embodiment of the present invention, and should not be considered as limitations of the present invention. The method can include other intermediate steps or can merge several steps into a single step without departing from the spirit of the present invention.

The abovementioned embodiments are presented merely for describing the present invention, and in no way should be considered to be limitations of the scope of the present invention. In summary, the present invention provides an equalizer and a related method. By respectively adopting the first feed-forward equalization module 110 and the second feed-forward equalization module 120 to equalize the input real-part component signal $x_r[n]$ and the input imaginary-part component signal $x_i[n]$, the signals inputted to the phase error corrector 130 can consist of two-dimensional inputs. Therefore, not only can the efficiency of the phase error corrector 130 for adjusting the phase error be improved, but also can the performance of the equalizer be promoted. Moreover, the output real-part component signal $eqo_r[n]$ of the equalizer 100 can be obtained by processing the second real-part component signal $y_{r2}[n]$ outputted from the phase error corrector 130 according to its feedback circuits. The estimated imaginary-part component signal $y_i'[n]$ can be generated by the filter 220 according to the third real-part component signal $y_{r3}[n]$. After that, the estimated imaginary-part component signal $y_i'[n]$ is subtracted from the delayed second imaginary-part component $y_{di2}[n]$ by a subtractor, so as to obtain the delayed output imaginary-part component signal $eqo_{di}[n]$. Finally, the obtained signals (such as the detecting result Sd, the output real-part component signal $eqo_r[n]$, the delayed output real-part component signal $eqo_{dr}[n]$, and the delayed output imaginary-part component signal $eqo_{di}[n]$) are inputted to the phase error estimator 250 for estimating the phase error information $d_r[n]$ and $d_i[n]$. Therefore, the phase error of the first real-part component signal $y_{r1}[n]$ and the first imaginary-part component signal $y_{i1}[n]$ can be substantially improved, so as to promote the performance of the equalizer.

Those skilled in the art will readily observe that numerous modifications and alterations of the device and method may be made while retaining the teachings of the invention.

What is claimed is:

1. An equalizer, comprising:
   a first feed-forward equalization module, for receiving an input real-part component signal of a complex input signal and for equalizing the input real-part component signal to generate a first real-part component signal;
   a second feed-forward equalization module, for receiving an input imaginary-part component signal of the complex input signal and for equalizing the input imaginary-part component signal to generate a first imaginary-part component signal; and
   a phase error corrector, coupled to an output of the first feed-forward equalization module and an output of the second feed-forward equalization module, for adjusting a complex phase corresponding to the first real-part component signal and the first imaginary-part component signal to generate a second real-part component signal and a second imaginary-part component signal according to a phase error information and a first operator, coupled to the phase error corrector, for performing an operation on the second real-part component signal and a third real-part component signal to generate an output real-part component signal;

a slicer, coupled to the first operator, for performing a hard decision on the output real-part component signal to generate a detecting result; and a feedback equalization module, coupled to the slicer and the first operator, for equalizing the detecting result to generate the third real-part component signal.

2. The equalizer of claim 1, wherein the second feed-forward equalization module equalizes the input imaginary-part component signal according to tap coefficients adopted by the first feed-forward equalization module.

3. The equalizer of claim 1, wherein the complex input signal is a vestigial sideband (VSB) signal.

4. The equalizer of claim 1, wherein the first operator is an adder for subtracting the third real-part component signal from the second real-part component signal to generate the output real-part component signal.

5. The equalizer of claim 1, further comprising:

a first delay, coupled to the phase error corrector, for delaying the second imaginary-part component signal to generate a delayed second imaginary-part component signal;

a filter, coupled to the feedback equalization module, for receiving the third real-part component signal and for generating an estimated imaginary-part component signal according to the third real-part component signal; and a second operator, coupled to the filter and the first delay, for performing an operation on the delayed second imaginary-part component signal and the estimated imaginary-part component signal to generate a delayed output imaginary-part component signal.

6. The equalizer of claim 5, wherein the second operator is an adder for subtracting the estimated imaginary-part component signal from the delayed second imaginary-part component signal to generate the delayed output imaginary-part component signal.

7. The equalizer of claim 5, further comprising:

a second delay, coupled to the first operator, for delaying the output real-part component signal to generate a delayed output real-part component signal;

wherein the delayed output real-part component signal and the delayed output imaginary-part component signal form a delayed complex output signal.

8. The equalizer of claim 7, further comprising:

a phase error estimator, coupled to the phase error corrector, for estimating the phase error information corresponding to the input real-part component signal and the input imaginary-part component signal according to at least one signal among the detecting result, the output real-part component signal, the delayed output real-part component signal, and the delayed output imaginary-part component signal.

9. The equalizer of claim 1, wherein each of the first feed-forward equalization module and the second feed-forward equalization module is a tapped delay line equalizer.

10. The equalizer of claim 1, being a decision feedback equalizer (DFE).

11. A method applied to an equalizer, comprising:

receiving an input real-part component signal of a complex input signal, and equalizing the input real-part component signal to generate a first real-part component signal; receiving an input imaginary-part component signal of the complex input signal, and equalizing the input imaginary-part component signal to generate a first imaginary-part component signal; and adjusting a complex phase corresponding to the first real-part component signal and the first imaginary-part component signal to generate a second real-part component signal and a second imaginary-part component signal according to a phase error information; and performing an operation on the second real-part component signal and a third real-part component signal to generate an output real-part component signal;

performing a hard decision on the output real-part component signal to generate a detecting result; and equalizing the detecting result to generate the third real-part component signal.

12. The method of claim 11, wherein the step of equalizing the input real-part component signal comprises:

equalizing the input real-part component signal according to tap coefficients adopted by a first feed-forward equalization module; and the step of equalizing the input imaginary-part component signal comprises:

equalizing the input imaginary-part component signal according to the tap coefficients adopted by the first feed-forward equalization module.

13. The method of claim 11, wherein the complex input signal is a vestigial sideband (VSB) signal.

14. The method of claim 11, wherein the step of performing the operation on the second real-part component signal and the third real-part component signal to generate the output real-part component signal comprises:

subtracting the third real-part component signal from the second real-part component signal to generate the output real-part component signal.

15. The method of claim 11, further comprising:

delaying the second imaginary-part component signal to generate a delayed second imaginary-part component signal;

receiving the third real-part component signal, and generating an estimated imaginary-part component signal according to the third real-part component signal; and performing an operation on the delayed second imaginary-part component signal and the estimated imaginary-part component signal to generate a delayed output imaginary-part component signal.

16. The method of claim 15, wherein the step of performing the operation on the delayed second imaginary-part component signal and the estimated imaginary-part component signal to generate the delayed output imaginary-part component signal comprises:

subtracting the estimated imaginary-part component signal from the delayed second imaginary-part component signal to generate the delayed output imaginary-part component signal.

17. The method of claim 15, further comprising:
delaying the output real-part component signal to generate a delayed output real-part component signal;
wherein the delayed output real-part component signal and the delayed output imaginary-part component signal form a delayed complex output signal.

18. The method of claim 17, further comprising:
estimating the phase error information corresponding to the input real-part component signal and the input imaginary-part component signal according to at least one signal among the detecting result, the output real-part component signal, the delayed output real-part component signal, and the delayed output imaginary-part component signal.

* * * * *